United States Patent
Drabarek et al.

(10) Patent No.: US 7,046,369 B2
(45) Date of Patent: May 16, 2006

(54) INTERFEROMETRIC MEASURING METHOD AND DEVICE FOR MEASURING THE SHAPE OF OR THE DISTANCE TO SURFACES

(75) Inventors: Pawel Drabarek, Tiefenbronn (DE); Norbert Streibl, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 10/374,313

(22) Filed: Feb. 25, 2003

(65) Prior Publication Data

US 2004/0125379 A1    Jul. 1, 2004

(30) Foreign Application Priority Data

Mar. 1, 2002    (DE) ............................. 102 04 133

(51) Int. Cl.
*G01B 11/02* (2006.01)
(52) U.S. Cl. ........................ 356/489; 356/512
(58) Field of Classification Search ........... 356/486, 356/487, 489, 511, 512, 513, 514
See application file for complete search history.

(56) References Cited

U.S. PATENT DOCUMENTS

| | | | | |
|---|---|---|---|---|
| 4,594,003 | A | * | 6/1986 | Sommargren ............... 356/489 |
| 4,886,363 | A | * | 12/1989 | Jungquist .................... 356/487 |
| 5,293,215 | A | | 3/1994 | Pfendler et al. |
| 5,777,742 | A | * | 7/1998 | Marron ....................... 356/511 |
| 5,883,715 | A | | 3/1999 | Steinlechner et al. |

FOREIGN PATENT DOCUMENTS

DE     198 08 273    9/1999

\* cited by examiner

*Primary Examiner*—Samuel A. Turner
(74) *Attorney, Agent, or Firm*—Kenyon & Kenyon, LLP

(57) ABSTRACT

An interferometric measuring method and device for measuring the shape of, or the distance to, surfaces are provided, in which light is generated, modulated with respect to its frequency, conducted to both an object surface and a reference surface, brought to interference, and conducted to a photodetector, and, to detect the particular distance, a phase of the photodetector signal is evaluated. A simple, rugged configuration, with the capability of taking a high-resolution measurements in the context of a large unambiguity range, is achieved in that the phase is considered in at least two different instants with the wavelengths that correspond on the basis of the frequency modulation, and the results are fed to the evaluation.

4 Claims, 2 Drawing Sheets

INTERFEROMETRIC MEASURING METHOD AND DEVICE FOR MEASURING THE SHAPE OF OR THE DISTANCE TO SURFACES

FIELD OF THE INVENTION

The present invention relates to an interferometric measuring method and device for measuring the shape of or the distance to surfaces, wherein light is generated, modulated with respect to its frequency, conducted to both a measured surface and a reference surface and then brought to interference, conducted to a photodetector, and, to measure the particular distance, a phase of the photodetector signal is evaluated.

BACKGROUND INFORMATION

An interferometric measuring method, as well as a measuring device are described in the German Published Patent Application No. 198 08 273. In this conventional interferometric measuring method, based on the principle of heterodyne technology, an acousto-optical modulator is used to shift the light frequency having a heterodyne frequency to facilitate the evaluation, and the distance to or the shape of the surface is determined by evaluating the phase difference. In this context, the phase differences in light components of the light, which is obtained from a short-coherent light source, split by a beam splitter into different wavelength ranges, and detected by a photodetector array, are simultaneously evaluated on the basis of the particular phase difference. Upon consideration of the phase difference, in the context of light of only one wavelength, the range of unambiguity may be limited to a change in distance between two measuring points of less than one half of the corresponding wavelength. On the other hand, a synthetic wavelength $\Lambda=\lambda_1 \cdot \lambda_2/(\lambda_2-\lambda_1)$ may be formed from at least two different wavelengths. From this follows a correspondingly larger unambiguity range, in which a correspondingly rougher measurement may be taken as a single-valued measurement. However, the increased unambiguity range may be associated with additional outlay.

U.S. Pat. No. 5,293,215 describes an interferometric measuring device which is likewise based on the concept of multi-wavelength heterodyne interferometry, wherein a frequency-modulated light-generating device having a plurality of frequency-modulated lasers as light sources for the various wavelengths is used.

U.S. Pat. No. 5,883,715 discusses an interferometer having a frequency-modulated light source for a vibrometer.

SUMMARY OF THE INVENTION

The present invention provides an interferometric measuring method and an interferometric measuring device, respectively, which, in the context of a simplified configuration, permit a relatively large measuring range.

According to one exemplary method of the present invention, the phase of a photodetector signal may be considered in at least two different instants with the wavelengths that correspond on the basis of the frequency modulation, and the results may be fed to the evaluation.

By considering the light components having different wavelengths at different instants, the surface measurement may be performed without an additional beam-splitter and the associated expensive photodetector array, and a downstream evaluation device may be adapted thereto. Because of the resulting simple configuration of the optical measuring system, the evaluation electronics may merely be configured to observe the phase differences at the different instants, with the corresponding different wavelengths. Appropriate software and programming may be used in this context, for example, to implement the evaluation in the evaluation electronics or evaluation unit.

The measuring device may be configured accordingly for the measurement, inclusive of the evaluation, so that a light source that is able to be modulated in its light frequency and, to that end, is connected to a modulator, whose light is split by a beam splitter into a reference wave and a measuring wave (MW) to be conducted to a surface of a measuring object, which are brought to interference, that to receive the light formed by the interfering light waves and having an intensity modulation, and to generate a corresponding electrical signal, a photodetector is provided, to which a downstream evaluation electronics is connected, to evaluate the electrical signals, while taking phase measurements, to form a synthetic wavelength from different wavelengths derived from the frequency modulation at spaced apart instants, and determine the distance to or the shape of the surface, in consideration of only the individual, different wavelengths and/or of the synthetic wavelength.

With regard to implementing the exemplary method and achieving a simple and rugged configuration, one exemplary embodiment provides for the light having the light components of the different wavelengths to be obtained via a conventional frequency modulation of a light source, and for the electrical signal obtained by the photodetector to be evaluated when the light frequencies belonging to the various wavelengths occur.

Given a simply configured evaluation unit, the exemplary method may be simply performed, in that, at an instant corresponding to one wavelength, a phase difference is determined, and a precision measurement is taken on the surface in accordance with the relation $\Delta L=\Delta p_1 \cdot \lambda_1/(4\pi)$; that at another instant corresponding to a different wavelength, a further phase difference is determined; and that on the basis of synthetic wavelength $\Lambda=\lambda_1 \cdot \lambda_2/(\lambda_2-\lambda_1)$, a rough measurement is taken on the surface in accordance with the relation $\Delta L=(\Delta p_1 - \Delta p_2) \cdot \Lambda/(4\pi)$.

In accordance with another exemplary embodiment, to select the instants, the evaluation electronics may be in signal communication with the modulator.

DETAILED DESCRIPTION

Figure 1:
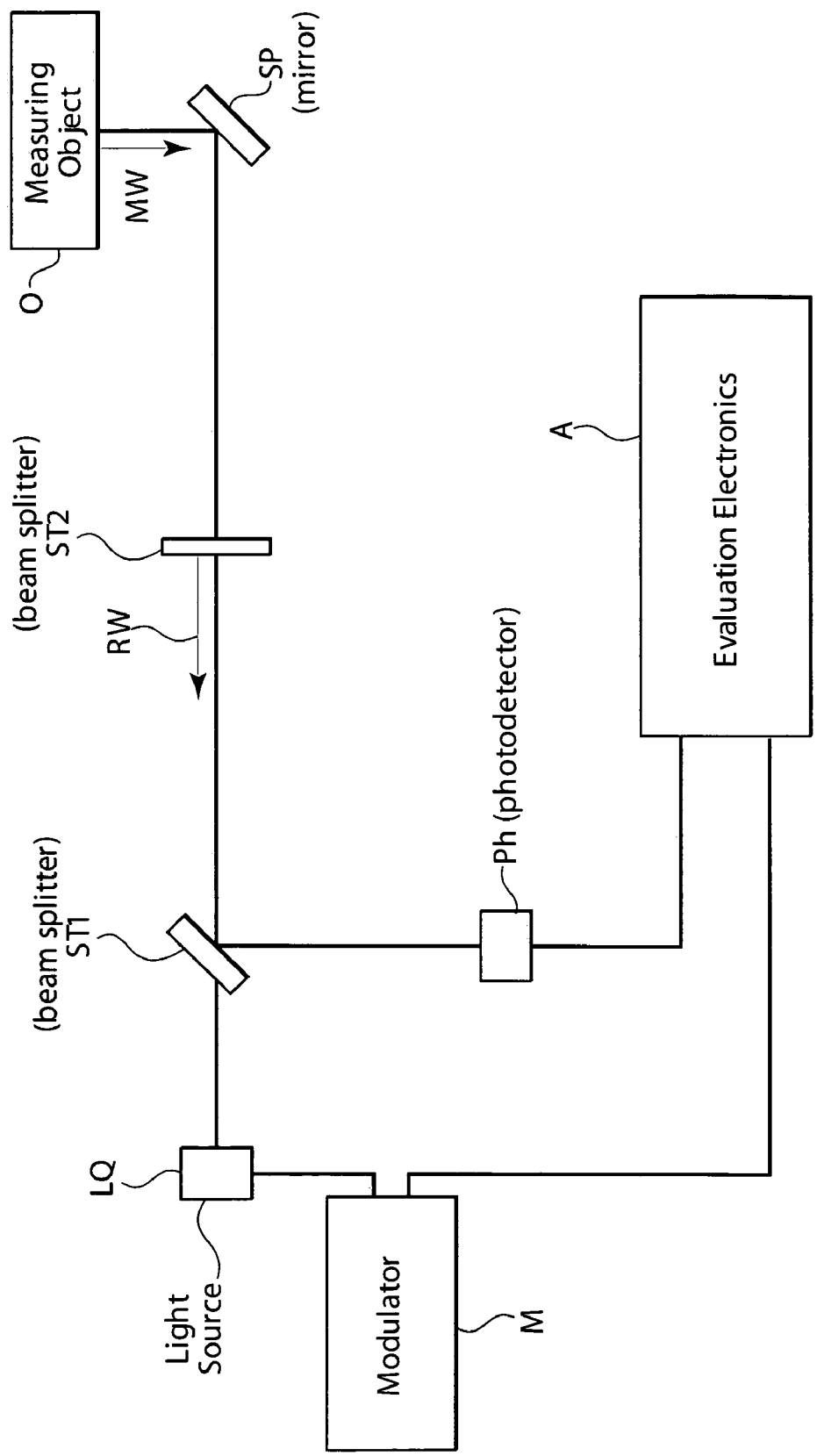
FIG. 1 shows a schematic representation of an exemplary configuration of an interferometric measuring device.

An interferometric measuring device shown in FIG. 1 in the form of a frequency-modulated multi-wavelength heterodyne interferometer has a light source LQ, which is connected to a modulator M for electrical control and whose light is conducted via a first beam splitter ST1 to a reference surface in the form of a further beam splitter ST2, and, there, is split into a return reference wave RW and a measuring wave MW that continues to the surface of a measuring object O via a reflecting mirror SP. Reference wave RW and return measuring wave MW interfere and are conducted by first beam splitter ST1 to a photodetector Ph, which converts the interfering and, as a result, intensity-modulated light into corresponding electrical signals, and feeds them to an evaluation electronics A, which, moreover, is in signal communication with modulator M.

Figure 3:
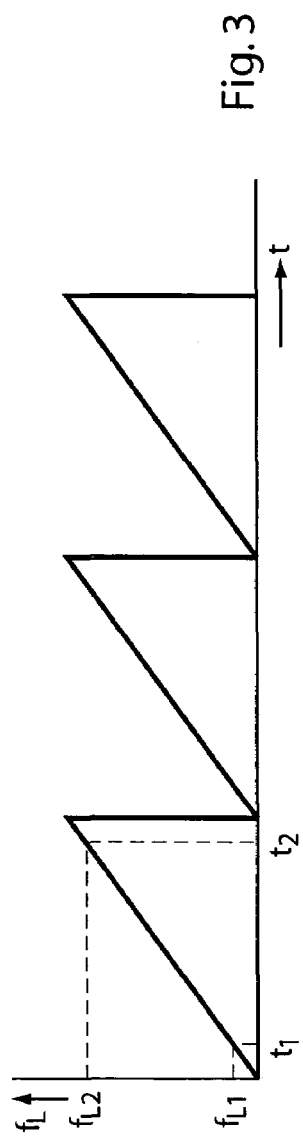
FIG. 3 shows the characteristic curve of the light frequency of the light source according to FIG. 1, over time, in the context of a control by the modulator.

Light frequency $f_L$ of light source LQ, e.g., of a laser diode, is shifted, e.g., linearly, in its frequency by modulator M, as schematically shown in FIG. 3. The frequency-modulated light beam, which is emitted by the light source and is coupled via first beam splitter ST1 into the system and is subsequently split into reference wave RW and measuring wave MW, undergoes a transit-time difference because of the difference in the geometric paths of reference wave RW and measuring wave MW. The frequency modulation and the transit-time difference results in a different phase modulation of the two interfering light waves, thereby resulting in an intensity modulation of the light at photodetector Ph. The intensity modulation is converted in photodetector Ph into the electrical signal and evaluated with reference to the modulator signal, to ensure a defined temporal relationship between the modulator signal and the evaluation.

Figure 2:
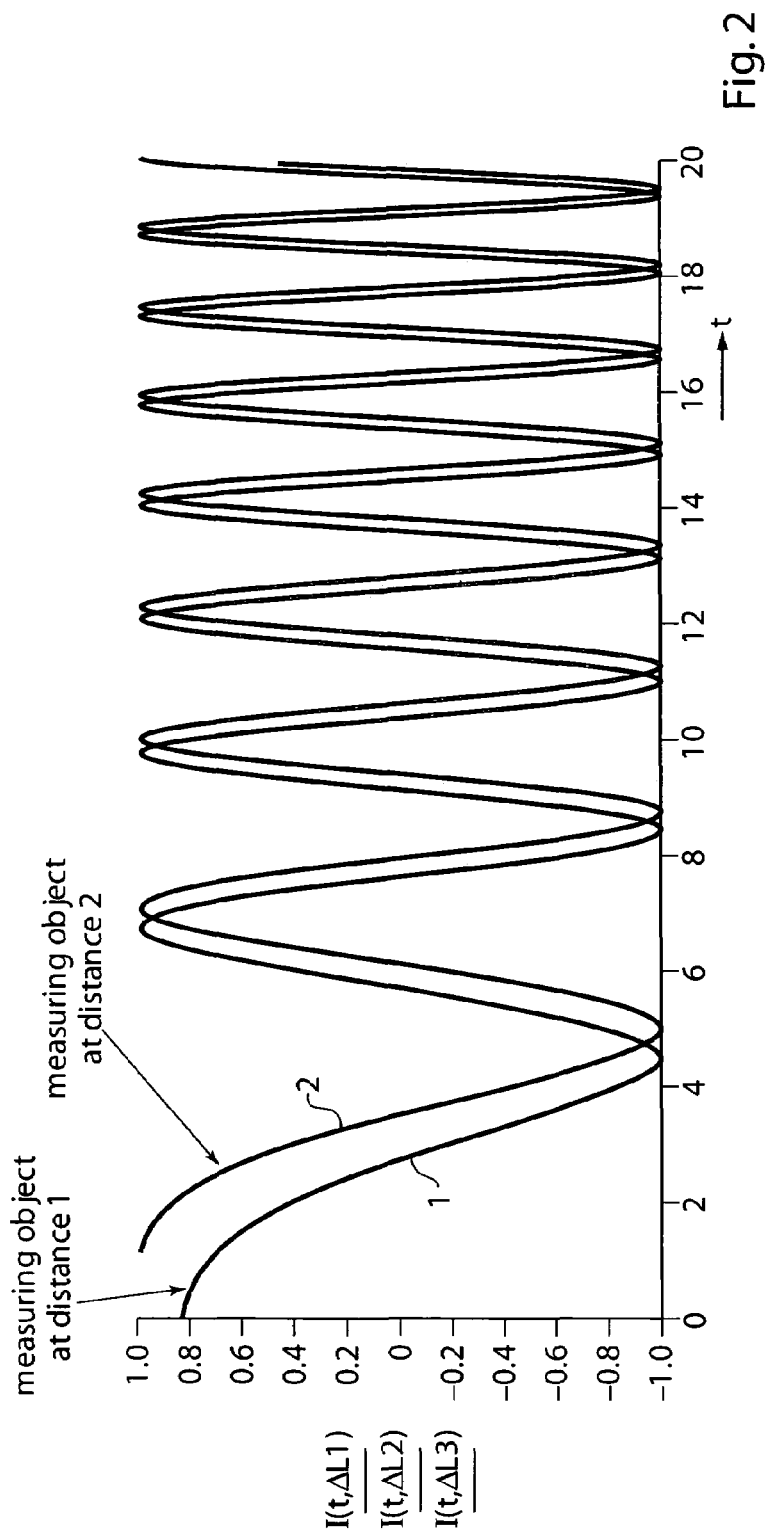
FIG. 2 shows a characteristic curve of an electrical signal obtained using the measuring device according to FIG. 1, in the context of a linear frequency modulation of the light source, at two different distances from a surface to be measured.

A characteristic curve of the electrical signal generated by photodetector Ph, for a linear frequency modulation, is shown exemplarily in FIG. 3. Two different distances to the surface of measuring object O are illustrated in FIG. 2. By measuring phase $\Delta\Phi_1$, e.g., of a sinusoidal crossing, in relation to the modulation signal, change in distance $\Delta L$ may be precisely measured in accordance with the relation $$\Delta L = \Delta p_1 \cdot \lambda_1/(4\cdot\pi),$$

$\lambda_1$ indicating the light wavelength at a corresponding light frequency $f_{L1}$ at an instant $t_1$, of the measurement, as illustrated in FIG. 3.

The measurement is single-valued when the difference in the distance between two measuring points is smaller than $\lambda_1/2$. The range of unambiguity of the interferometer is expanded by a second measurement using the electrical signal in that, as likewise shown in FIG. 3, an additional phase measurement is made at a later instant $t_2$, existing within the same cycle of the frequency shift (ramp in FIG. 3). At later instant $t_2$, due to the modulation of light frequency $f_L$ and, thus, of light wavelength $\lambda$, the phase having the different wavelength $\lambda_2$ is obtained in accordance with the relation $$\Delta\Phi_2 = \Delta L \cdot 4 \cdot \pi/\lambda_2$$

from the two different wavelengths $\lambda_1$ and $\lambda_2$. The wavelengths $\lambda_1$, $\lambda_2$ may, for example, be clearly distinguished within one measuring cycle, when the two corresponding instants $t_1$ and $t_2$ are near the beginning and, respectively, the end of the frequency shift. A synthetic wavelength $\Lambda = \lambda_1 \cdot \lambda_2/(\lambda_2 - \lambda_1)$ may then be obtained in a conventional manner. Taking synthetic wavelength $\Lambda$ as a basis, the change in distance may be determined, at a lower resolution, from the phase measurements at instants (actually short time intervals) $t_1$ and $t_2$. The measurement is single-valued when the difference in the distance between two measuring points is smaller than half of synthetic wavelength $\Lambda$. For example, in comparison to the product of the two wavelengths, wavelength difference $\lambda_2 - \lambda_1$ may be selected so that synthetic wavelength $\Lambda$ amounts to 100 μm.

By combining the accurate measurement (precise measurement) and the low-resolution measurement (rough measurement), a high-resolution measurement may be provided within a large range of unambiguity. Phase differences $\Delta\Phi_1$ and $\Delta\Phi_2$ may be determined in a conventional manner using evaluation electronics A, the determination being made, however, in time succession at instants $t_1$, and $t_2$, and the allocated, different wavelengths $\lambda_1$ and $\lambda_2$ being taken as a basis for the rough measurement. The measurements are triggered with the aid of the modulator signal.

Due to the feature that the measurements are taken in time succession for different wavelengths $\lambda_1$ and $\lambda_2$ obtained by the frequency modulation of light frequency $f_L$, a simply-configured optical measuring system may be achieved without the need for a spectral splitting unit. A heterodyne-interferometric measuring device configuration that differs from that of FIG. 1 may also be used, reference wave RW and measuring wave MW being formed, for example, using separate measuring arms, as may be conventional in the context of heterodyne interferometers.

In place of a heterodyne interferometer, a different measuring system including evaluation of the phase difference may be selected to determine the distance to the surface, whereas the heterodyne technique, however, may render a simpler evaluation.

What is claimed is:

1. An interferometric measuring method for measuring one of a shape of an object surface and a distance to an object surface, comprising:
   generating a light;
   frequency-modulating the light;
   conducting a first portion of the light to the object surface;
   conducting a second portion of the light to a reference surface;
   bringing a first reflected light from the object surface and a second reflected light from the reference surface to interference;
   conducting the first reflected light and the second reflected light to a photodetector;
   and evaluating a phase of a photodector signal in at least two different instants with wavelengths that correspond on a basis of the frequency modulation
   determining a first phase difference at a first instant corresponding to a first wavelength;
   undertaking a measurement in accordance with a first relation $$\Delta L = \Delta p_1 \cdot \lambda_1/(4\pi);$$

determining a second phase difference at a second instant corresponding to a second wavelength; and
   taking a measurement on the object surface in accordance with a second relation $$\Delta L = (\Delta p_1 - \Delta p_2) \cdot \Lambda/(4\pi)$$

on a basis of a synthetic wavelength defined by a third relation $$\Lambda = \lambda_1 \cdot \lambda_2/(\lambda_2 - \lambda_1),$$

wherein $\Delta p_1$ represents the first phase difference, $\Delta p_2$ represents the second phase difference, $\lambda_1$ represents the first wavelength, $\lambda_2$ represents the second wavelength, $\Lambda$ represents the synthetic wavelength, and $\Delta L$ represents a change in distance to the object surface.

2. The interferometric measuring according to claim 1, further comprising:
obtaining the phase of the photodetector signal with reference to a frequency of a modulation signal of a light source.

3. An interferometric measuring device for determining one of a distance to an object surface and a shape of an object surface, comprising:
a light source for emitting light;
a modulator for modulating the light at a first frequency;
a beam splitter for splitting the light into a reference wave and a measuring wave, the measuring wave being conducted to the surface of the object and subsequently being brought into interference with the reference wave;
a photodetector for receiving intensity-modulated light formed by the interfering waves and for generating a corresponding electrical signal;
evaluation electronics connected to the photodetector for evaluating the electrical signal and for taking phase measurements to determine the one of the distance to the object surface and the shape of the object surface in consideration of at least one of different wavelengths derived from the frequency modulation at spaced-apart time instants and a synthetic wavelength formed from the different wavelengths, the evaluation electronics including:

an arrangement for determining a first phase difference at a first instant corresponding to a first wavelength;
an arrangement for undertaking a measurement in accordance with a first relation $$\Delta L = \Delta p_1 \cdot \lambda_1 / (4\pi);$$

an arrangement for determining a second phase difference at a second instant corresponding to a second wavelength; and
an arrangement for taking a measurement on the object surface in accordance with a second relation $$\Delta L = (\Delta p_1 - \Delta p_2) \cdot \Lambda / (4\pi)$$

on a basis of a synthetic wavelength defined by a third relation $$\Lambda = \lambda_1 \cdot \lambda_2 / (\lambda_2 - \lambda_1),$$

wherein $\Delta p_1$ represents the first phase difference, $\Delta p_2$ represents the second phase difference, $\lambda_1$ represents the first wavelength, $\lambda_2$ represents the second wavelength, $\Lambda$ represents the synthetic wavelength, and $\Delta L$ represents a change in distance to the object surface.

4. The measuring device according to claim 3, wherein the evaluation electronics is in signal communication with the modulator in order to select the spaced-apart time instants.

* * * * *